United States Patent

[11] 3,627,413

[72] Inventors George E. Bushey;
Willard D. Isbell, both of San Diego, Calif.
[21] Appl. No. 80,551
[22] Filed Oct. 14, 1970
[45] Patented Dec. 14, 1971
[73] Assignee Cubic Corporation
San Diego, Calif.

[54] MICROFICHE FILM TRANSPORT UNIT
17 Claims, 11 Drawing Figs.
[52] U.S. Cl. .................................................. 355/53,
352/82, 352/83, 353/27, 355/54
[51] Int. Cl. ..................................................... G03b 27/46
[50] Field of Search .......................................... 355/47, 53,
54; 353/27; 352/46, 70, 82, 83

[56] References Cited
UNITED STATES PATENTS
3,059,530 10/1962 Groak .......................... 355/54 X
3,194,112 7/1965 Back ............................ 355/47
3,502,411 3/1970 Wells ........................... 355/54

Primary Examiner—Joseph F. Peters, Jr.
Assistant Examiner—Richard A. Wintercorn
Attorney—Carl R. Brown ABSTRACT: A microfiche film transport unit for use with a sequential recording camera having stationary optics. Supply and takeup magazines are mounted on a carriage or platform, which also carries film advance mechanism for moving film linearly over a platen at the lens position. The carriage is hinged and is itself moved to pass the film laterally across the lens position. A precision stepping motor drives the carriage to move the film in precise frame increments in a column across the width of the film and a fast return mechanism returns the film to the beginning of the column. Another stepping motor advances the film at the completion of each column. The drive mechanism is readily adaptable to variable format and frame programming control from a conventional microfiche camera, and the unit will handle the two most common widths of microfiche film with minor adjustments in the mechanism.

PATENTED DEC 14 1971

INVENTORS
GEORGE E. BUSHEY
WILLARD D. ISBELL

BY Carl R. Brown

ATTORNEY

PATENTED DEC 14 1971

INVENTORS
GEORGE E. BUSHEY
WILLARD D. ISBELL

BY

*Carl R. Brown*

ATTORNEY

INVENTORS
GEORGE E. BUSHEY
WILLARD D. ISBELL

BY Carl R. Brown

ATTORNEY

INVENTORS
GEORGE E. BUSHEY
WILLARD D. ISBELL
ATTORNEY 3,627,413

MICROFICHE FILM TRANSPORT UNIT

BACKGROUND OF THE INVENTION

In the preparation of microfiche film, on which large numbers of small images are recorded in columns of spaced frames, various techniques have been devised to space the images in precise sequence. In some instances the image is positioned by movable optics, which requires compensation for image distortion and involves complex mechanism. In other instances the film is moved in increments, but the mechanisms involved are limited in speed and precision.

Microfiche cameras are available which are incorporated into display apparatus, with means for producing images by projection or on a cathode-ray tube, such apparatus being capable of displaying a large amount of data at high speed in sequential image frames. To utilize fully the capability of the camera equipment, it is necessary to record the images on film at high speed, with sufficient precision in focus and alignment to permit consistently clear reproduction in projection or readout apparatus.

SUMMARY OF THE INVENTION

In the film transport unit described herein, the film is moved at high speed in precise incremental steps, past a fixed lens position at which sequential images are presented. The unit is completely self-contained and is easily attached to or removed from a camera, and is also provided with a hinged cover to facilitate loading or unloading film while the unit is on a camera.

The film is fed by a positive drive system from a supply magazine to a takeup magazine, all of which are mounted on a carriage supported on hinges within the lighttight case of the unit. The film passes over a platen closely adjacent to the fixed lens position and is held in close alignment by specially shaped rollers. A precision stepping motor swings the carriage in incremental steps to move the film to successive frame positions before the lens position, the frames extending in a column across the width of the film. At the end of each column, a fast return cam mechanism returns the carriage and another precision stepping motor advances the film linearly by a single column increment.

Film is extracted from the supply magazine by a demand-type drive, which maintains a loop of film to avoid undue tension on the film. The takeup magazine has a constantly running drive with slip means to wind in the film with a light tension to avoid bunching. Both magazines are held by quick-acting locks and the film is easily threaded through a simple path, alignment being ensured by the special guide rollers. The two most used sizes of microfiche film, which are 105 and 82 millimeters in width, can both be used in the unit with a few simple adjustments in the mechanism.

The primary object of this invention, therefore, is to provide a new and improved microfiche film transport unit.

Another object of this invention is to provide a new and improved microfiche film transport unit which is self-contained with all drive means, and will handle two sizes of film.

Another object of this invention is to provide a new and improved microfiche film transport unit having step drive means for advancing the film in precise frame increments in spaced columns of frames, at high speed.

A further object of this invention is to provide a new and improved microfiche film transport unit which is easily mounted on a camera and in which the film can be loaded or unloaded in standard magazines while the unit is in operating position.

Other objects and many advantages of this invention will become more apparent upon a reading of the following detailed description and an examination of the drawings, wherein like reference numerals designate like parts throughout.

DESCRIPTION OF THE PREFERRED EMBODIMENT

Figure 1:
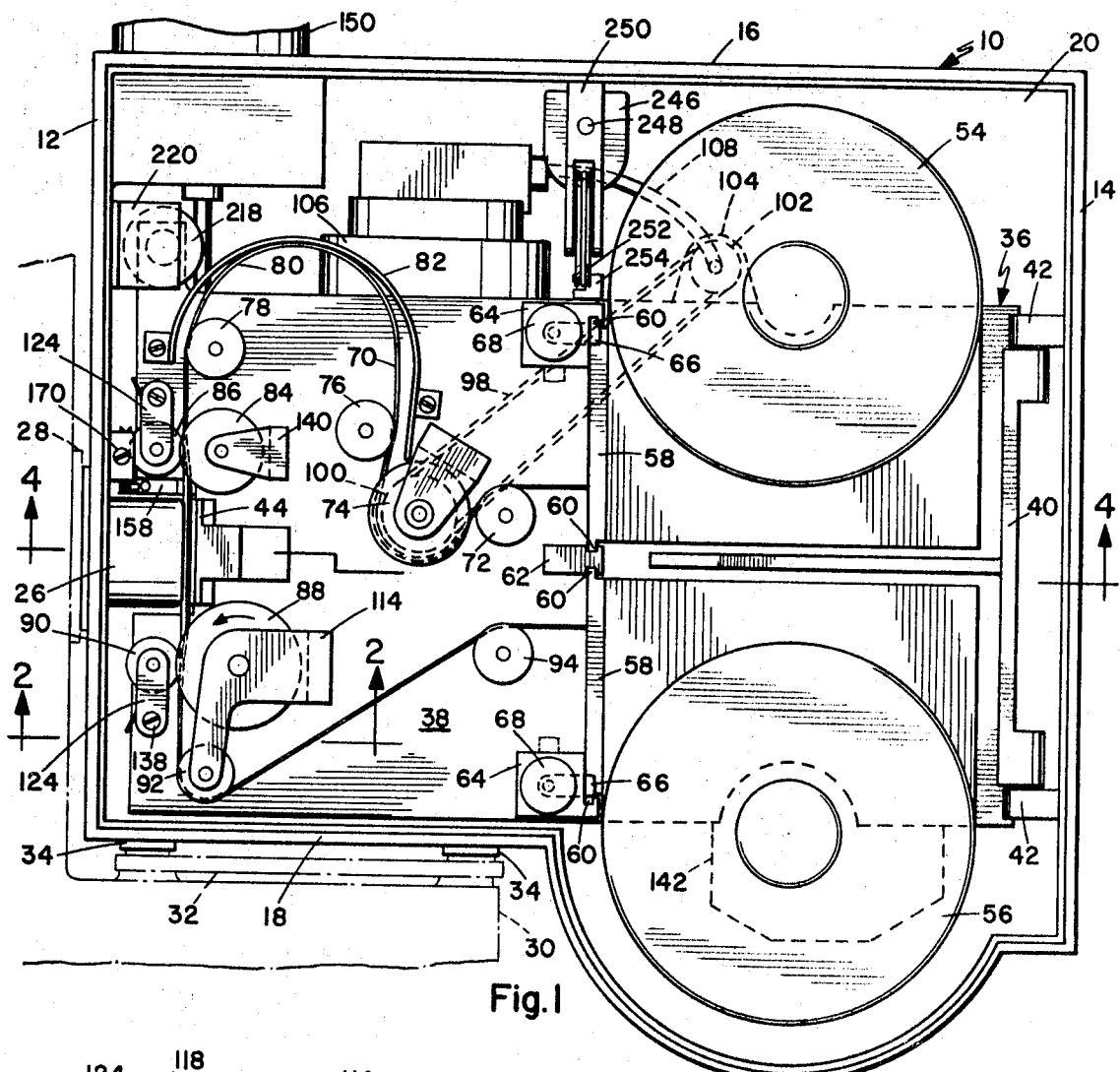
FIG. 1 is a side elevation view of the unit, with the cover removed.

The film transport mechanism is contained in a casing 10 having a front wall 12, backwall 14, top wall 16, bottom wall 18, and one side fully closed by a sidewall 20. The other side is enclosed by a lighttight cover 22, held by hinges 24 and secured by any suitable lock or fastener means. In the front wall 12 is a lens barrel 26 which fits against the lens 28 of a camera 30, indicated in broken line in FIG. 1. The unit is normally mounted with the casing in the orientation described and is attached to the camera mounting bracket 32 by conventional-type fittings 34 on the bottom wall 18.

Inside the casing is a carriage 36, comprising a generally rectangular flat platform 38 with a rear flange 40 projecting on one side. The carriage 36 is pivotally attached to the backwall 14 by hinges 42 connected to rear flange 40, the hinge axis being vertical and intersecting the optical axis of lens barrel 26. Fixed on the forward end of platform 38 is a platen 44, elongated horizontally and having a film-supporting front face 46 which is arcuate on a radius from the axis of hinges 42. As the carriage swings, the film is thus maintained at a constant close spacing from lens barrel 26. To hold the film securely, the platen 44 has vents 48 in the face 46, communicating with an internal cavity 50 which has a vacuum connection 51 for coupling to a suitable vacuum source, not shown. The optical system is in the camera on which the film transport unit is used, the only optical component in the unit being a correcting lens 52 in the lens barrel 26 to compensate for the curvature of the film on the platen.

On the rear portion of platform 38 are a supply magazine 54 and a takeup magazine 56, each having a standardized mounting plate 58 with outwardly opposed tongues 60. The magazines fit into place in side-by-side relation with the tongues 60 sliding in a grooved common center post 62 and grooved outer post 64 fixed on the platform. Each outer post 64 has a pivotal latch tongue 66 actuated by a knob 68 to swing over the respective mounting plate 58 and lock the magazine in place. Other quick-acting securing means may be equally suitable. The magazines are standard items and are made to hold 105-millimeter-wide microfiche film. If 82-millimeter film is required, the same magazines may be used and the film centered therein by spacers, thus simplifying the structure necessary to handle both film sizes.

The film 70 is guided through a series of rollers, all mounted on platform 38 and extending perpendicular thereto on the same side as the magazines, the complete film-handling mechanism and the magazines riding together in constant alignment on the carriage 36. From the supply magazine 54, the film passes over a freely rotatable idler roller 72, then under and around a supply drive roller 74 for substantially 180° of its circumference. The film continues upwardly over a pair of idler rollers 76 and 78 to form a loop 80, which is contained in a substantially arcuate loop-holding guide 82. Immediately above the platen 44 is a guide roller 84, against which the film is held by a pinch roller 86 and fed across the platen. Below the platen is the main film-advancing drive roller 88, against which the film is held by a pinch roller 90. The film then passes under an idler roller 92 and over a final idler roller 94 to the takeup magazine 56.

Supply drive roller 74 is of the type described in copending application Ser. No. 45,412, filed June 11, 1970 and entitled "Web Transport." This type of roller grips the extreme edges of the film between inwardly opposed flange faces 96, which have a shallow angle of inclination. When the film wraps around the roller for about 180°, as shown, the drive is positive as long as there is any tension on the takeup side of the roller. As soon as tension decreases, as by formation of loop 80, the film will slip in roller 74, the result being that film is withdrawn from the supply magazine in an intermittent manner as required to maintain a loop. Drive roller 74 is driven constantly by a belt 98 extending from a pulley 100, coupled to the roller below platform 38, to a pulley 102 mounted on a bracket 104 at the upper edge of the platform. A motor 106 attached to sidewall 20 has a flexible drive shaft 108 which extends to pulley 102 and accommodates the movement of the carriage. To provide the same type of drive for the narrower film, roller 74 has a reduced-diameter portion 110 with a second set of opposed inclined faces 112, to grip the narrower film by its edges.

Figure 2:
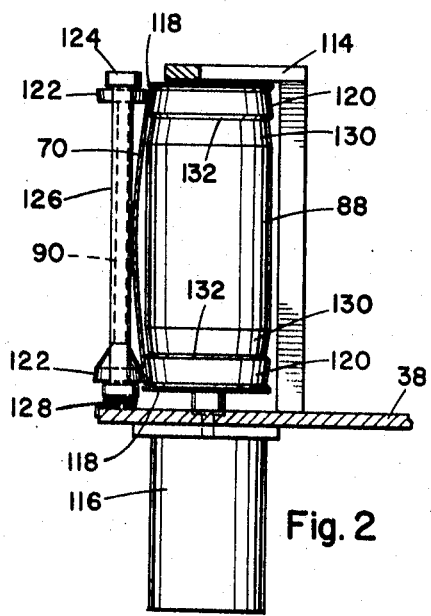
FIG. 2 is a sectional view taken on line 2—2 of FIG. 1.

The drive roller 88 is supported in a bracket 114 and is driven directly by a stepping motor 116 mounted on platform 38. At both ends of roller 88 are flanges 118 to hold the film in track, the edge portions of the film riding on outwardly convergent tapered portions 120 of the roller, immediately inwardly of the flanges. Pinch roller 90 has enlarged end portions 122 which hold the film in firm driving contact on the drive roller 88, and the spacing between flanges 118 is slightly less than the film width, so that the film is held in arcuate form, as in FIG. 2, as it leaves the platen 44. Pinch roller 90 is mounted in a frame 124, which is pivotally mounted on a post 126 on the platform 38, the frame being biased by a spring 128 to hold the pinch roller against the film.

Figure 3:
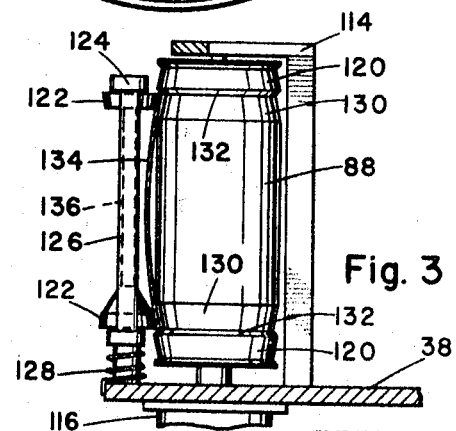
FIG. 3 is a similar sectional view showing adaptation to narrower film.

To handle narrower film, drive roller 88 has a second set of tapered portions 130 inwardly of portions 120, with flanges 132 to hold the edges of the narrow film 134, as in FIG. 3. In this instance, the pinch roller 136 is shorter than pinch roller 90, but otherwise similar in all respects, the structural elements being numbered to correspond with roller 90 for reference. A screw 138 through post 126 into platform 38 makes the pinch roller readily replaceable for the film size to be used, this being one part of the mechanism which is actually changed.

Guide roller 84 is supported in a bracket 140 and is similar in all respects to drive roller 88, but smaller in diameter for convenience. Pinch roller 86 is similar to pinch roller 90 and mounted in the same manner to hold either size of film in arcuate form to ride smoothly over the platen 44. The pinch roller 86 is the only other component which is changed to suit the size of film being used.

The takeup magazine is coupled to a constantly running takeup motor 142 mounted on platform 38 and having a noncircular shaft 144 over which the spool-driving plug 146 fits in rotating engagement. Shaft 144 is driven through a conventional slip clutch 148, set to apply just enough tension to avoid slack or bunching in the film after it leaves the drive roller 88.

Figure 4:
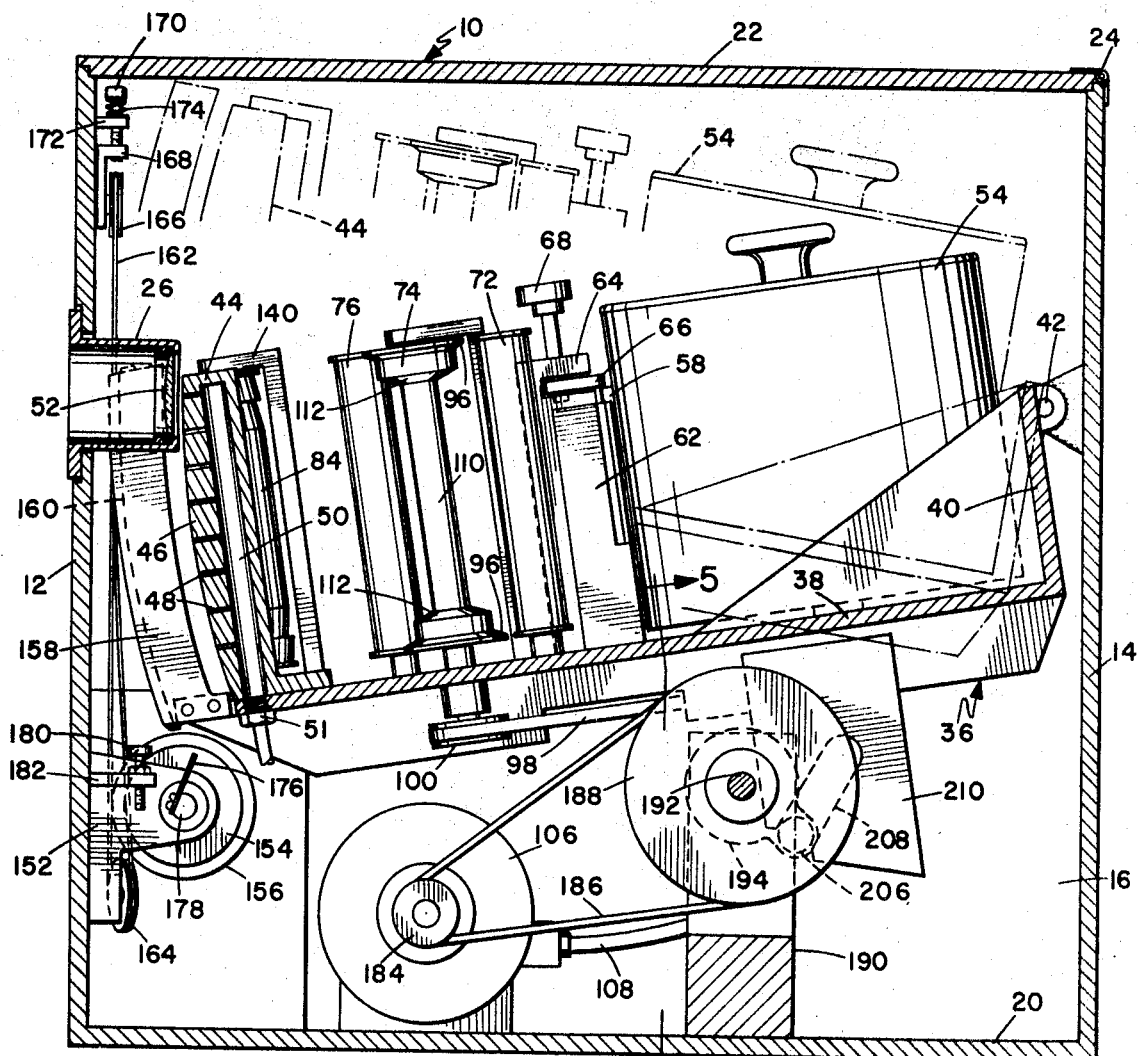
FIG. 4 is a sectional view taken on line 4—4 of FIG. 1.
Figure 5:
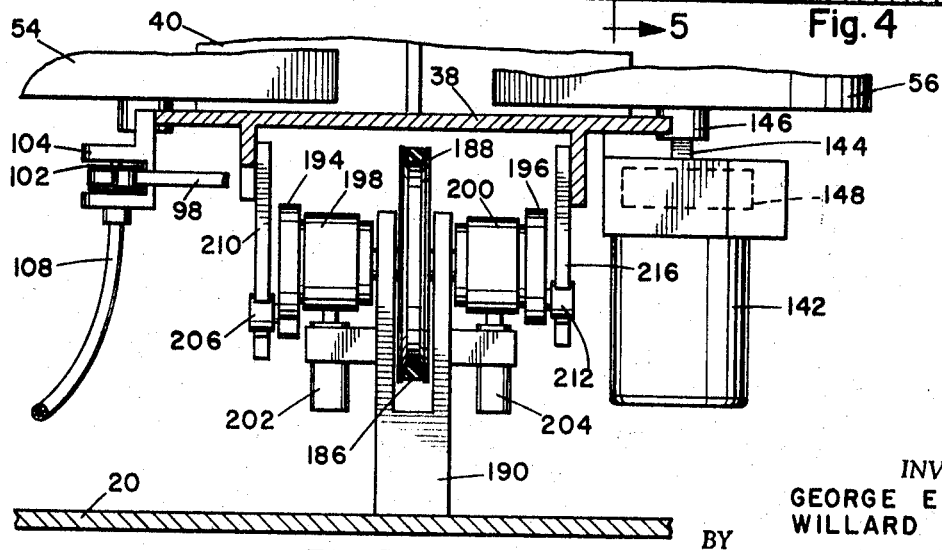
FIG. 5 is a sectional view taken on line 5—5 of FIG. 4.
Figure 6:
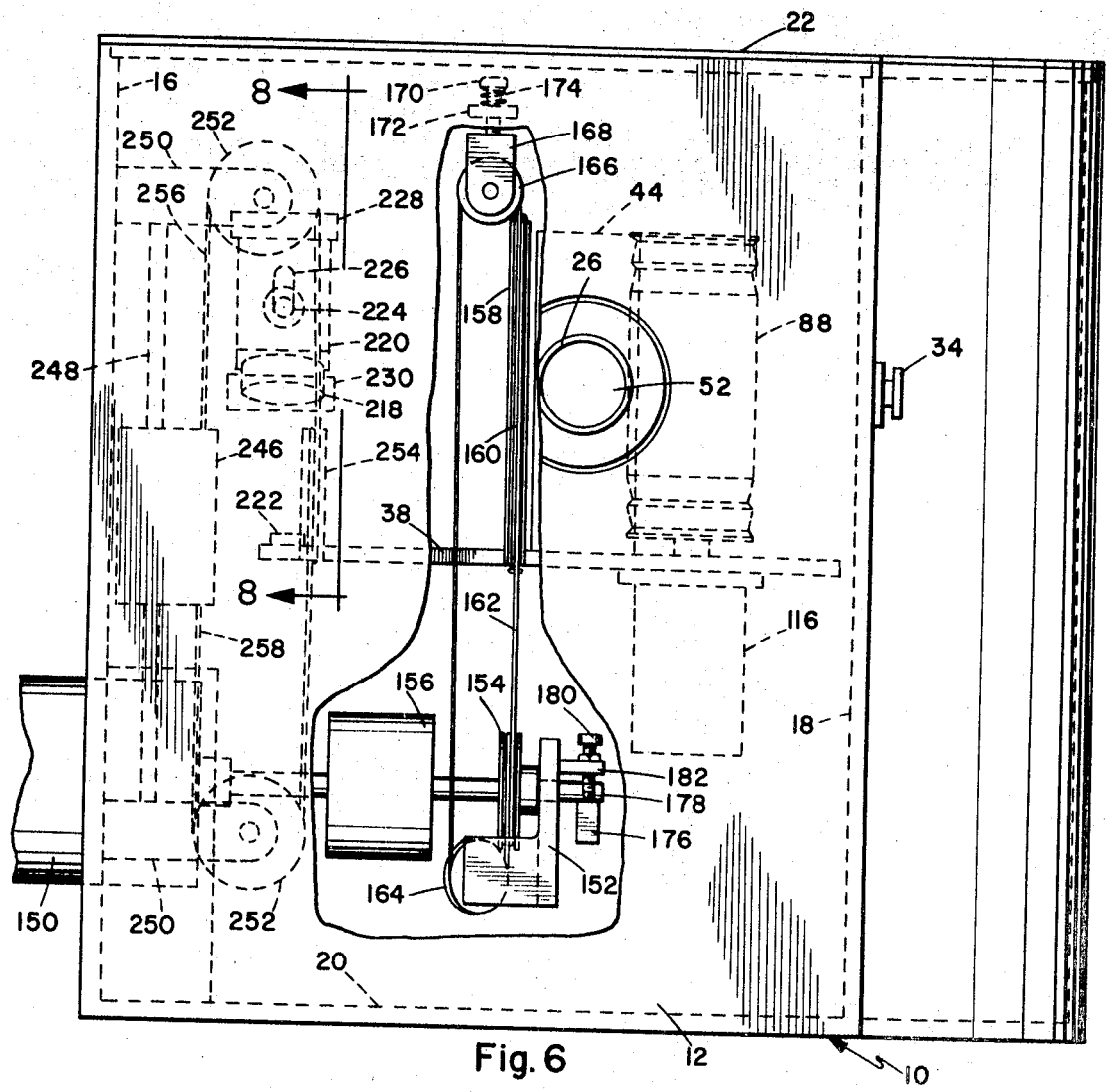
FIG. 6 is a front view of the unit with a portion cut away.

All of the film guiding and advancing mechanism is thus mounted on the platform 38 and remains in precise alignment. To move the film laterally across the optical axis in increments of one frame, the entire carriage 36 is moved by means of a stepping motor 150 mounted on sidewall 16. On the front wall 12 is a bracket 152 carrying a drive pulley 154, which is driven by motor 150 through an electromagnetic release clutch 156. Fixed to the forward edge of platform 38 is a coupling bar 158, having a channel 160 in its forward edge which is arcuate on a radius from the axis of hinges 42. A flexible cable 162 is secured at one end to the end of coupling bar 158 remote from drive pulley 154, the cable extending along channel 160 and being wrapped around the drive pulley to provide a secure driving connection. The cable then passes around a guide pulley 164 mounted on bracket 152 and returns to a tension pulley 166 at the opposite side of front wall 12, the other end portion of the cable extending along channel 160 and being fixed to the other end of coupling bar 158. Tension pulley 166 is mounted on a bracket 168 held by a tension screw 170 through a lug 172 fixed on front wall 12, a spring 174 under the head of the screw providing controlled tension on the cable 162. To prevent excess travel of carriage 36, a stop bar 176 is fixed radially to the end of shaft 178 carrying the drive pulley 154. An adjustable stop screw 180 threaded through an arm 182 on bracket 152 engages stop bar 176 and limits travel of the carriage to the position indicated in broken line in FIG. 4, which is the starting position for a column of frames. Stepping motor 150 drives the carriage 36 in increments of one frame at the platen, from the broken line position to the full position in FIG. 4, the latter position being at the end of travel for a column of frames across the film.

For maximum speed of operation, the carriage is not returned by the stepping motor, but by a fast return cam mechanism. Motor 106 continuously drives a pulley 184 coupled by a belt 186 to a pulley 188, which is mounted on a bearing post 190 on sidewall 20. Pulley 188 is fixed to a shaft 192 which extends on both sides of post 190 and drives a pair of cam discs 194 and 196 through one-turn clutches 198 and 200, respectively, the clutches being engaged, selectively by solenoids 202 and 204. Solenoid-actuated one-turn clutches are well known and are operated by momentary energization of a solenoid to make one rotation only in driving engagement. Cam disc 194 carries a cam roller 206 which engages in a slot 208 in a cam plate 210 fixed to platform 38. Cam disc 196 has a similar roller 212 which engages in a slot 214 in a cam plate 216 fixed to the platform.

Figure 10:
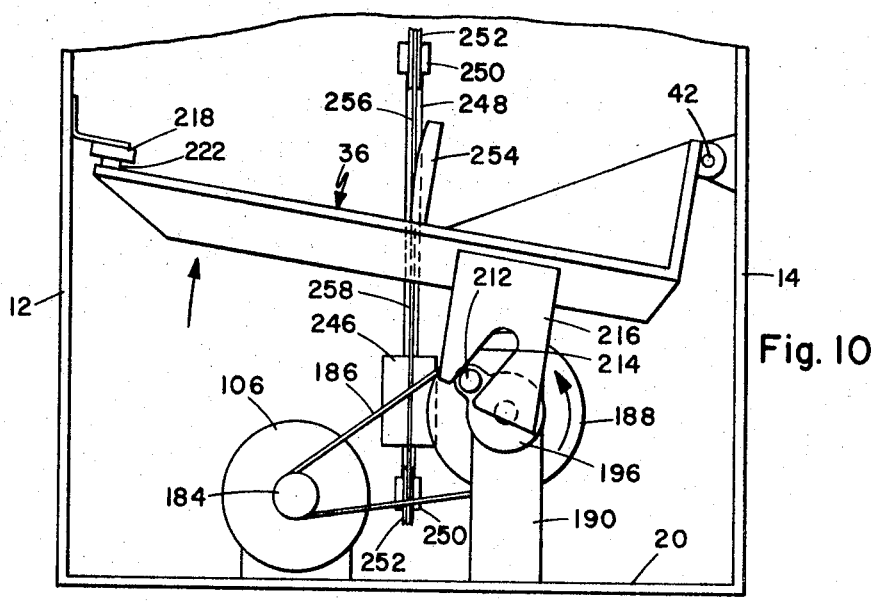
FIG. 10 is a diagrammatic view, similar to a portion of FIG. 4 on a reduced scale, showing the fast return action of the carriage.

The cam return action is shown in FIG. 10, rotation of cam disc 196 drives roller 212 into slot 214, lifting the cam plate 216 and carriage 36. Release clutch 156 is released during the return action to disengage stepping motor 150 from the cable drive and allow the cable to return rapidly. The two cam assemblies differ only in the radius or throw of the rollers from the axis of shaft 192, and the lengths of the cam plates, Cam disc 194 is dimensioned to provide the largest return motion of the carriage for the 105-millimeter film. Cam disc 196 provides a reduced-return motion for the width of the 92-millimeter film, either action being selected by energizing the appropriate one-turn clutch.

Figure 8:
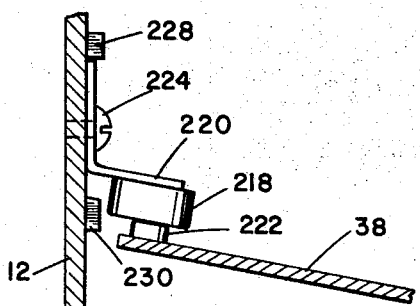
FIG. 8 is a sectional view taken on line 8—8 of FIG. 6.
Figure 9:
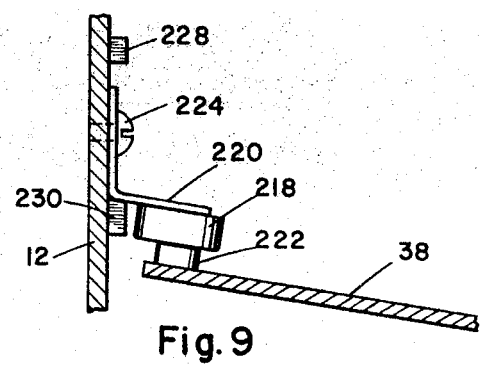
FIG. 9 is a sectional view similar to FIG. 8, showing adjustment for narrower film.

At the end of the return travel, the carriage is held momentarily to avoid bouncing by an electromagnetic retaining magnet 218, held on a bracket 220 on the front wall 12, the magnet holding an iron stud 222 secured to the front of platform 38. To accommodate the two ranges of travel, bracket 220 is secured by a screw 224 through a slot 226 and is adjustable between two fixed stops 228 and 230. In FIG. 8, the bracket is against stop 228 for maximum range of travel of the carriage. In FIG. 9, the bracket is against the inner stop 230 to position the magnet for the reduced range of travel.

Since the return action is very rapid and there is considerable inertia in the moving components, the one-turn clutches are preferably of the antioverrun type such as manufactured by Precision Specialties Inc. to ensure that precisely one turn of the mechanism occurs. Also, because the film transport unit is attached directly to the camera structure, it is necessary to compensate for the inertia of the mechanism. This is accomplished by means of a counterweight 246 mounted at one side of the carriage and coupled to move in opposition to the carriage. The counterweight 246 slides on a rod 248 fixed between a pair of brackets 250 secured to top wall 16, the brackets also carrying a pair of pulleys 252. Fixed to the adjacent side of platform 38 is an arcuately grooved bar member 254, similar in configuration to coupling bar 158. FRom one end of bar member 254, a cable 256 extends along the arcuate channel and around one pulley 252 to the counterweight 246. Another cable 258 extends from the other end of the bar member and around the other pulley 252 to the counterweight. Thus the counterweight is connected directly to the carriage to move in the opposite direction in synchronization, which counteracts the inertia and prevents the action from shaking the camera.

Figure 7:
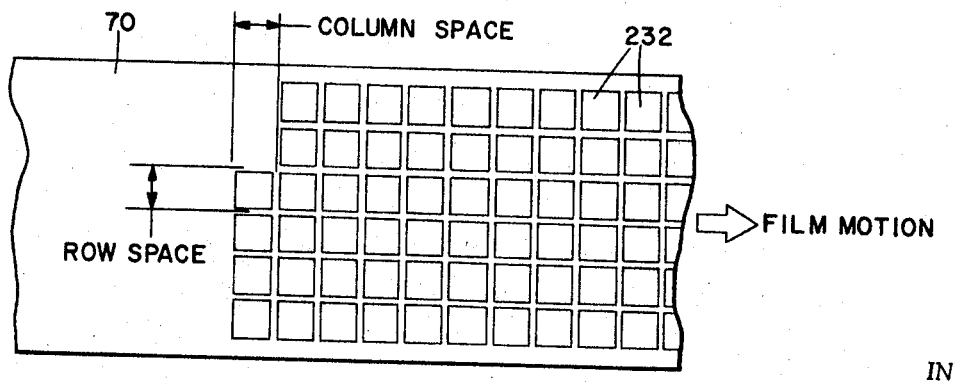
FIG. 7 is a view of a typical piece of film.

A typical section of film 70 is shown in FIG. 7, the individual frames 232 being spaced in rows across the width of the film and in columns along the length of the film. The frames are exposed in sequence in a column, the film returning at the end of the column and advancing one column width. The stepping motors controlling film motion must be synchronized with the display of images to be recorded and with the camera.

A typical camera unit for recording data in microfiche form is the KOM-90 made by Cubic Corporation. This unit is capable of providing images in the form of slides, cathode-ray tube displays and combinations of these and other displays. Provision is made in the unit for varying the format of the frames and selecting film size, setting the exposure and the rate of change of images, and generating film-driving signals corresponding to the selected form. The stepping motors are driven by a pulsed power source in the camera unit, the number of pulses determining the frame spacing at each shift of the film. With the KOM-90 camera unit, the pulse rate is on the order of 200 pulses to move the film one frame space on a few milliseconds, the high pulse rate allowing precise control.

Figure 11:
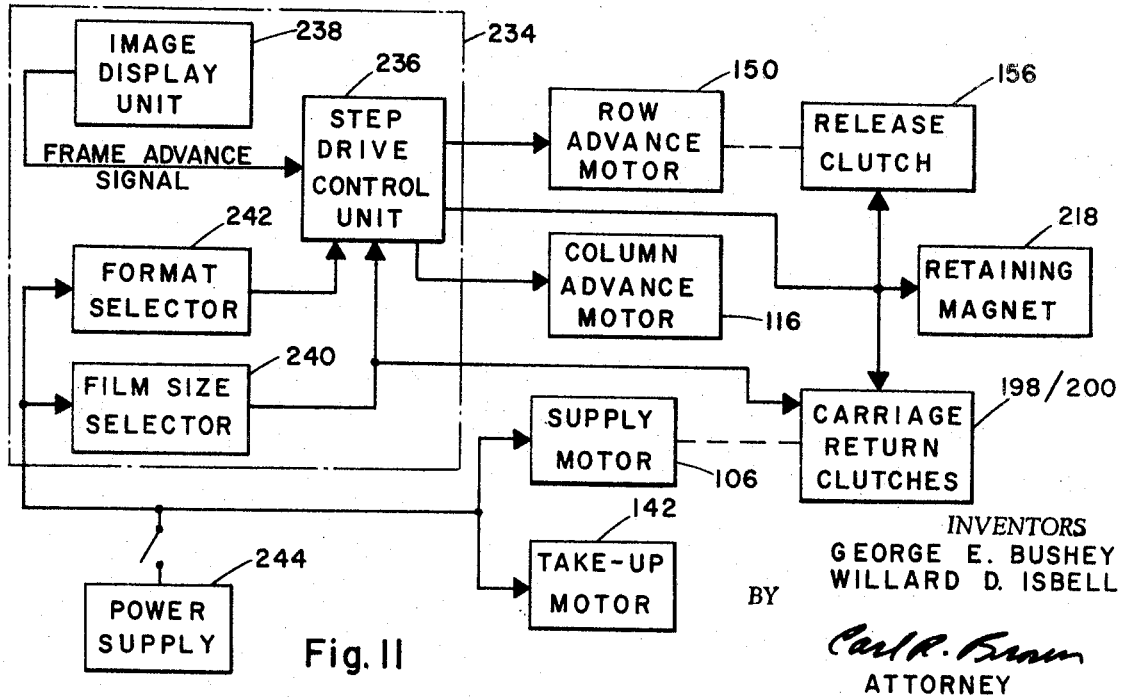
FIG. 11 is a simplified block diagram of the control circuitry.

In FIG. 11, the camera apparatus is represented by box 234 and includes a step drive control unit 236, which provides the pulsed power, an image display unit 238 which controls the camera and provides a frame advance signal after each exposure, a film size selector 240 and a format selector 242, which sets the number of pulses to be applied at each frame advance. Electrical wiring in the film transport unit is omitted for clarity but it will be obvious that suitable connection means will be provided for connection to the camera unit and the power supply 244. Supply motor 106 and takeup motor 142 operate continuously and are not independently controlled.

As each frame is exposed, the row advance stepping motor 150 is energized for a specific number of pulses to move the carriage and shift the film one frame space. At the end of travel of one column, the control unit 236 releases clutch 156, energizes the appropriate return clutch 198 or 200 and energizes retaining magnet 218. At the same time, the column advance motor 116 is energized for a specific number of pulses to advance the film by one frame width. When the carriage return action is complete, the retaining magnet is deenergized and clutch 156 is reengaged, so that the stepping motor 150 can begin the next set of frames.

The operation can continue at high speed, since the direct synchronization with the image display and the precise control of film positioning ensure consistent accuracy. With motors 106 and 142 running continuously, there is no delay in application of their power, as there would be with intermittently operating motors. The film is easily loaded with the unit on the camera, with the cover 22 open and the carriage at the beginning of a column position adjacent the cover. By pulling back the pinch rollers 86 and 90, the film can be dropped into place around the simple path and is automatically aligned by the various rollers.

Having described our invention, we now claim:

1. A film transport unit for use on microfiche camera apparatus having means for displaying a succession of images to be recorded and providing stepped control signals corresponding to the timing and spacing of image frames in successive spaced columns along a strip of film, the unit comprising:
  a lighttight casing having a front wall with a lens barrel therein;
  attachment means on said casing for securing the unit to a camera, with said lens barrel in optical registration with the camera lens;
  a carriage having a platform pivotally mounted in said casing with hinge means remote from said front wall and having a hinge axis substantially perpendicular to and intersecting the optical axis of said lens barrel;
  a platen fixed to said platform in closely spaced relation to said lens barrel, said platen having an arcuate film-supporting face with a center of radius at said hinge axis;
  securing means for holding a film supply magazine and a film takeup magazine on said platform;
  a series of rollers mounted on said platform and positioned to guide a strip of film from a supply magazine, across said platen, to a takeup magazine;
  said rollers including a drive roller for drivingly engaging the film;
  a column-stepping motor coupled to said drive roller and being responsive to the stepped control signals from the camera apparatus to advance the film in increments of one column spacing;
  and a row-stepping motor coupled to said carriage and being responsive to the stepped control signals to swing the carriage and move said platen past said lens barrel in increments of one frame space, between a column start position and a column end position.

2. A film transport unit according to claim 1, wherein said row-stepping motor drives said carriage in one direction to the column end position;
  and including fast return drive means coupled to said carriage to return the carriage to the column start position as each column of frames is completed.

3. A film transport unit according to claim 2, wherein said fast return drive means comprises a cam disc rotatably mounted in said casing and having a cam roller thereon, a cam plate fixed to said platform for engagement by said roller, and one-turn drive means coupled to said cam disc.

4. A film transport unit according to claim 3, wherein said one-turn drive means comprises a constantly operating motor, and a one-turn clutch coupled between said motor and said cam disc.

5. A film transport according to claim 4, and including a second one-turn clutch coupled to said motor, a second cam disc coupled to said second clutch and having a cam roller thereon, a second cam plate fixed to said platform for engagement by said second roller, said first and second cam rollers having different lengths of throw corresponding to the motion of said carriage required for two different sizes of film, and said one-turn clutches being selectively operable by the control signals from the camera apparatus.

6. A film transport unit according to claim 1, wherein said drive roller is adjacent to one side of said platen and has end flanges spaced apart slightly less than the width of the film, whereby the film is bowed therebetween to conform to the curvature of the platen.

7. A film transport unit according to claim 6, wherein said drive roller has outwardly convergent tapered portions immediately inward of said flanges, and including a pinch roller biased to hold the edge portions of the film against said tapered portions.

8. A film transport unit according to claim 7, and including a guide roller similar in configuration to said drive roller, positioned on the other side of said platen, with a pinch roller biased to hold the film therein.

9. A film transport according to claim 8, wherein said drive roller and said guide roller each has a second pair of flanges inwardly of said tapered portions to hold a narrower film in bowed position therebetween.

10. A film transport according to claim 1, wherein said series of rollers includes a supply roller adjacent the supply magazine position, said supply roller having intermittent driving engagement with the film, and a loop-retaining guide secured to said platform between said supply roller and said platen for holding a loop of film.

11. A film transport unit according to claim 1, wherein said row-stepping motor has a drive pulley coupled thereto, a flexible cable wrapped around said drive pulley with a driving connection, a pair of supporting pulleys on said front wall spaced on opposite sides of said carriage, said cable extending around said supporting pulleys and the ends of the cable being secured to said platform.

12. A film transport unit according to claim 11, and including a coupling bar fixed to the forward edge of said platform, said coupling bar having an arcuate channel with a center of radius at said hinge axis, the end portions of said cable extending along said channel and being secured to opposite ends of said coupling bar.

13. A film transport unit according to claim 11, and including stop means connected to said drive pulley to limit the rotation thereof.

14. A film transport unit according to claim 2, and including retaining means for holding said carriage momentarily in the column start position after the fast return action is completed.

15. A film transport unit according to claim 14, wherein said retaining means is adjustable to two positions corresponding to the column start position of said carriage for two different widths of film.

16. A film transport unit according to claim 1, and including a counterweight movably mounted in said casing, said counterweight being connected to said platform to move in synchronous opposition thereto.

17. A film transport unit according to claim 16, and including a pair of brackets fixed in said casing, a rod extending between said brackets on which said counterweight is slidable, a pair of pulleys on said brackets and cables extending from said counterweight, around said pulleys, to said platform.

* * * * *